Figure 1:
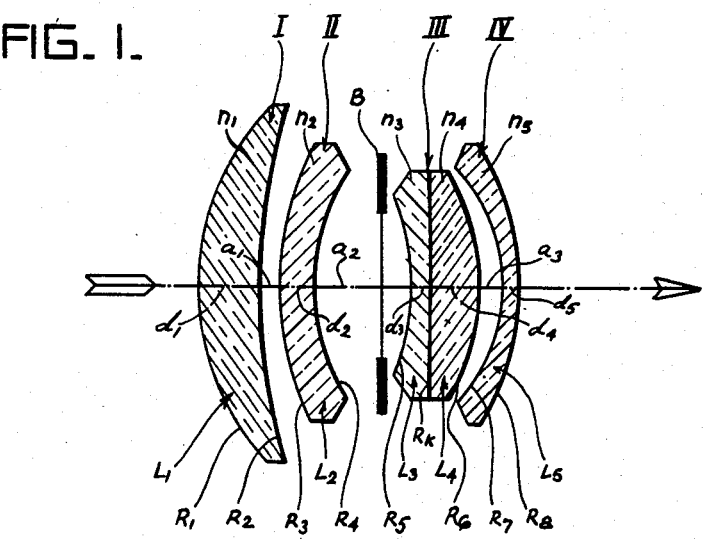

March 2, 1954    A. W. TRONNIER    2,670,659
MODIFIED GAUSS-TYPE PHOTOGRAPHIC OBJECTIVE FORMED
OF FOUR COMPONENTS ARRANGED IN TWO GROUPS
Filed July 29, 1952

INVENTOR.
ALBRECHT WILHELM TRONNIER
BY Mock-Blum
ATTORNEYS

Patented Mar. 2, 1954

2,670,659

UNITED STATES PATENT OFFICE 2,670,659

MODIFIED GAUSS-TYPE PHOTOGRAPHIC OBJECTIVE FORMED OF FOUR COMPONENTS ARRANGED IN TWO GROUPS

Albrecht Wilhelm Tronnier, Gottingen, Germany, assignor to Voigtlander, A. G., Braunschweig, Germany, a corporation of Germany Application July 29, 1952, Serial No. 301,455

Claims priority, application Switzerland August 30, 1951

6 Claims. (Cl. 88—57)

This invention relates to a photographic objective of the specific group of the modified Gauss type, in which the diaphragm is enclosed by lens groups in such manner that in the front group arranged on the side of the longer conjugate, as well as in the rear group, which follows the objective in the direction of light on the side of the minor conjugate, a positive meniscus-shaped lens, which is concave toward the diaphragm, is followed by a negative lens, which is likewise meniscus-shaped and concave toward the diaphragm. In modified Gauss-type objectives of this group, at satisfactory correction of apertural aberrations an anastigmatically flattened effective image field of over 50° can be obtained.

The main object of the present invention is to provide a new and improved modified Gauss type objective of the before-mentioned group, which has a novel structure resulting in an increase of the effective image field to more than 75°.

In the new objective according to the invention, the positive, meniscus-shaped front lens, which terminates the objective on the side of the major conjugate, as well as the two negative meniscus-shaped lenses, which follow said front lens, and are concave toward the diaphragm, consist of uncemented individual lenses. These last mentioned two negative lenses enclose a meniscus-shaped positive lens which follows the diaphragm on the side of the minor conjugate, is concave toward the diaphragm and is formed as a cemented lens having a distinctly converging cemented surface, which is substantially convex toward the diaphragm.

It has been found to be of advantage to preferably have a difference of refractive indices, which is higher than 0.050, at said characteristic converging cemented surface ($R_K$) in positive lens (III), which follows the diaphragm on the side of the minor conjugate. By using this feature, a strong curvature of this cemented surface is safely avoided and, therefore, the thickness of this lens member can be kept within narrow limits, which are desirable in connection with the use of relatively small lens diameters even in the case of very large image angles and the high inclination of rays connected therewith.

It has been also found that in the use of the new objective structure according to the present invention, already at middle size relative apertures above 1:6, effective image angles of distinctly higher than 80° can be obtained, if, in accordance with further features of the present invention, a particular favorable curvature of the outer surfaces of members of the system, which border upon air, is used. By expressing these characteristics of curvature in conventional manner, on the one hand by the sum and, on the other hand, by the difference of lengths of the two radii of curvature referred to each other, and expressing them in proper manner in percentage relative to the equivalent focal length of the total objective, the following further features of the invention can be stated.

The two strongly diverging inner surfaces $R_4$ and $R_5$, which limit the diaphragm space, are preferably curved in such manner that the sum of the absolute lengths of the radii of curvature of these surfaces, which enclose an air lens of biconvex form, is in the range of 25% to 75% of the equivalent focal length, while the difference of said equivalent lengths is in the range of 0 to 25% of said equivalent focal length.

The curvature of lens surfaces $R_6$ and $R_7$, which enclose a meniscus-shaped air space of concave shape toward the diaphragm, is preferably selected in such manner, that in this case too the sum of the absolute lengths of the radii of curvature $R_6$ and $R_7$ is in the range of 25% to 75% of the equivalent focal length, and the difference of said absolute lengths is in the range of 0 to 25% of said equivalent focal length.

Furthermore, according to the invention the curvature of the two outer surfaces $R_1$ and $R_8$ of the total objective is preferably selected in such manner that also in this case the sum of the absolute lengths of said radii is in the range of 25% to 75% of the equivalent focal length and simultaneously the difference of said absolute lengths is in the range of 0 to 25% of said equivalent focal length.

A photographic objective showing the characteristic refractive sequence

"+—diaphragm+—"

of lenses separated by air spaces, has been described in British Patent No. 459,739. However, the objective disclosed in said patent does not belong to the type embodying the present invention and represents a specific modification of the Gauss type. In this specific modification, the part of the objective preceding the diaphragm contains a cemented system of three elements, in which two lenses of said system consist of glasses of very high refractive power, and enclose a third lens consisting of glass of extremely low refractive power, and the inner cemented surfaces show differences above 0.20 of the refractive numbers. The objective according to said British patent contains seven lenses and can be successfully used at relative apertures exceeding 1:3, for image angles up to 60°. In comparison with the objective shown in said British patent, the objective according to the present invention has a considerably larger effective image field at middle size relative apertures and a lower number of lenses.

Apart from this, the objective according to said British Patent 459,739 is distinguished from the construction type according to the present invention not only by its general design and the number of its lenses, but also by the curvatures of its lenses, which are entirely different from those of the present invention. In the case of the British patent, the above mentioned sum of radii is in the range of 125.8% to 443.5% of the equivalent focal length, while the above mentioned difference is in the range of 31.4% to 391.7% of the total focal length. Moreover, in the objective of the British patent, the cemented positive member, which follows the diaphragm, is not meniscus-shaped and is a biconvex lens of unequal curvature.

Figure 2:
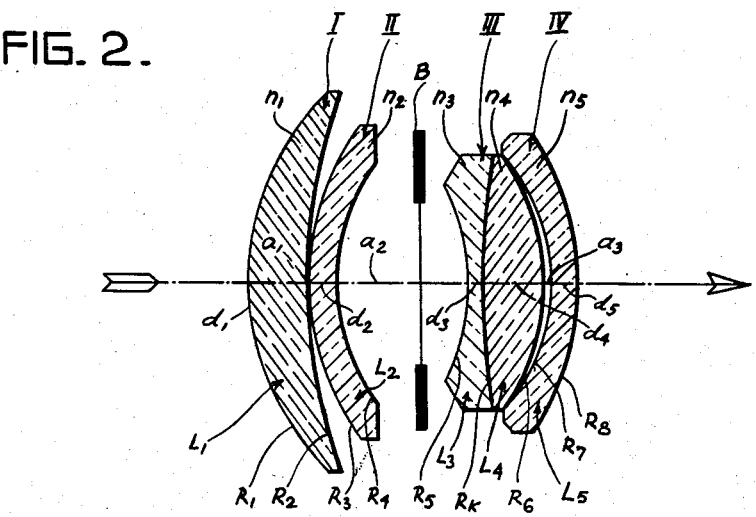

Figure 1 illustrates, by axial sections of the lenses, an objective embodying the present invention and the symbols used in the examples. Figure 2 illustrates an embodiment of the invention for an equivalent focal length f=150 mm. in natural size, and the structure of this embodiment corresponds to the following examples.

Referring now in detail to Figure 1, the lens members arranged on both sides of diaphragm B, are denoted I, II, III, and IV, the individual lens elements are denoted $L_1$, $L_2$, $L_3$, $L_4$, $L_5$, the axial thickness of these elements $d_1$, $d_2$, $d_3$, $d_4$, $d_5$, and their distances $a_1$, $a_2$ and $a_3$, in the direction from the major to the minor conjugate. The radii of curvature of the lens surfaces are consecutively denoted and numbered $R_1$, $R_2$, $R_3$, $R_4$, $R_5$, $R_6$, $R_7$ and $R_8$ in the same direction. The lens glasses are characterized in the same consecutive order by their mean refractive indices $n_1$, $n_2$, $n_3$, $n_4$, $n_5$, based on the yellow spectral line of the helium light $(n_d)$, and in connection with their color dispersion by their numerical value of the Abbé number $\nu$ (nu).

Figure 2 illustrates an embodiment of the invention for an equivalent focal length of f= 150 mm., in natural size and the design and structure of the objective here shown correspond to the figures of the following table. The data of the following Examples I and II refer to a focal length of 1. Accordingly, the radii of lenses, the thickness of lenses measured along the optical axis and the air distances are expressed in the same unit. The reference symbols used in the following tables correspond to those used in Figure 1.

The following Examples I and II are based on the use of different glasses in order to illustrate the possibility of variations in embodiments of the present invention. The specific selection of radii of curvature may be likewise varied in carrying out the invention. Thus, in Example I, outer radius $R_6$ turned toward the minor conjugate, of positive lens member (III), which follows the diaphragm, is smaller than the corresponding outer radius $R_4$ of diverging lens member (II) which precedes the diaphragm, while in Example II, radius $R_6$ is considerably longer than said other radius $R_4$. This second example illustrates also the possibility of successfully using several surfaces of equal curvature and lenses of equal design in the present new objective type, the image field of which amounts to 85° at this simplified manufacture.

Example I

[f=1.0    1:5.5    $p_{t}'$=0.82606]

| | | | |
|---|---|---|---|
| $R_1$=+0.24461 | $d_1$=0.04640 | $n_1$=1.62095 | $\nu_1$=60.3 |
| $R_2$=+0.47728 | $a_1$=0.00028 | air | |
| $R_3$=+0.21487 | $d_2$=0.01705 | $n_2$=1.72800 | $\nu_2$=28.4 |
| $R_4$=+0.16875 | $a_2$=0.13068 | diaphragm space | |
| $R_5$=−0.23103 | $d_3$=0.01136 | $n_3$=1.51443 | $\nu_3$=54.7 |
| $R_K$=+0.53931 | $d_4$=0.05114 | $n_4$=1.60921 | $\nu_4$=58.8 |
| $R_6$=−0.16241 | $a_3$=0.00994 | air | |
| $R_7$=−0.14906 | $d_5$=0.02083 | $n_5$=1.56866 | $\nu_5$=56.2 |
| $R_8$=−0.24234 | | | |

The difference of refractive numbers at cemented surface $R_K$ is 0.09478, i. e. distinctively higher than 0.050, while this surface proper has a positive sign of direction, and is thus convex toward the preceding diaphragm.

Furthermore, the relation of radii at the diaphragm space is as follows:

$$R_4 = 0.16875 \text{ abs.}$$
$$R_5 = 0.23103 \text{ abs.}$$

The sum is thus 0.39978 and the difference 0.06228. This sum is 39.978%, i. e. in the range of 25% and 75% of the total focal length and the difference is 6.228% i. e. between 0 and 25% of the focal length of the system.

In connection with the curvature at air space $a_3$, the table shows the following:

$$R_6 = 0.16241 \text{ abs.}$$
$$R_7 = 0.14906 \text{ abs.}$$

Thus, the sum is 0.31147 and the difference is 0.01335. This sum represents 31.147% of f, and the difference is 1.335% of the focal length.

The sum of outer radii $R_1$ and $R_8$ amounts to 48.695% of f, and the difference is 0.227% of f.

Example II

[f=1.0    1:5.5    $p_{t}'$=0.84470]

| | | | |
|---|---|---|---|
| $R_1$=+0.23539 | $d_1$=0.05347 | $n_1$=1.59142 | $\nu_1$=58.4 |
| $R_2$=+0.47846 | $a_1$=0.00164 | air | |
| $R_3$=+0.23539 | $d_2$=0.01601 | $n_2$=1.72800 | $\nu_2$=28.4 |
| $R_4$=+0.17538 | $a_2$=0.12303 | diaphragm space | |
| $R_5$=−0.23539 | $d_3$=0.01177 | $n_3$=1.51443 | $\nu_3$=54.7 |
| $R_K$=+1.01977 | $d_4$=0.05243 | $n_4$=1.65953 | $\nu_4$=57.0 |
| $R_6$=−0.20191 | $a_3$=0.00779 | air | |
| $R_7$=−0.17538 | $d_5$=0.01601 | $n_5$=1.60266 | $\nu_5$=38.4 |
| $R_8$=−0.23539 | | | |

The difference of refractive numbers at cemented surface $R_K$ is 0.14510, i. e. distinctively higher than 0.050. The curvatures at the diaphragm space are as follows:

$$R_4 = 0.17538 \text{ abs.}$$
$$R_5 = 0.23539 \text{ abs.}$$

Thus, the sum amounts to 0.41077 and the difference of radii to 0.06001, or in per cent of the total focal length 41.077% and 6.001% of f.

The curvatures at air space $a_3$, are as follows:

$$R_6 = 0.20191 \text{ abs.}$$
$$R_7 = 0.17538 \text{ abs.}$$

Thus, the sum is 0.37729 and the difference of radii 0.02653, or in per cent, 37.729% and 2.653% of the focal length.

In connection with the curvatures of the outer surfaces the figures show:

$$R_1 = 0.23539 \text{ abs.}$$
$$R_8 = 0.23539 \text{ abs.}$$

Thus, the sum is 0.47078 and the difference of radii is 0, or in per cent, 47.078% of the equivalent focal length and 0, i. e. the lowest possible value, for the difference.

In the objectives embodying the present invention the individual lens elements are characterized by the following data of curvature, referred to the equivalent focal length f:

(I)      $0.16 f < +R_1 < 0.32 f$
        $0.32 f < +R_2 < 0.64 f$
(II)     $0.16 f < +R_3 < 0.32 f$
        $0.10 f < +R_4 < 0.25 f$
        $R_3 > R_4$
(III)    $0.16 f < -R_5 < 0.32 f$
        $0.25 f < +R_K < 1.25 f$
        $0.10 f < -R_6 < 0.25 f$
(IV)    $0.10 f < -R_7 < 0.25 f$
        $0.16 f < -R_8 < 0.32 f$
        $R_7 < R_8$

The reference symbol $p_o'$ is used to denote the paraxial intersectional width of the objective.

What is claimed is:

1. A modified Gauss-type photographic objective having a large effective image field, comprising a lens front group consisting of a first and a second lens member arranged on the side of the major conjugate, and a lens rear group consisting of a first and a second lens member arranged on the side of the minor conjugate, and an intermediate diaphragm arranged between the second lens member of the front group and the first lens member of the rear group, said objective embodying the following characteristics: (a) in the lens front group, as well as in the lens rear group, a positive meniscus which is concave toward the diaphragm, is followed by a meniscus-shaped diverging lens which is concave toward the diaphragm; (b) the positive front meniscus which limits the objective on the side of the major conjugate, as well as the two meniscus-shaped divering lenses following in the direction of light, which are concave toward the diaphragm are uncemented individual lenses; (c) said two meniscus-shaped diverging lenses enclose a positive, meniscus-shaped lens member which is concave toward the diaphragm, is a cemented lens and contains a distinctly converging cemented surface; (d) the individual lens elements meet the following conditions:

(I)      $0.16 f < +R_1 < 0.32 f$
        $0.32 f < +R_2 < 0.64 f$
(II)     $0.16 f < +R_3 < 0.32 f$
        $0.10 f < +R_4 < 0.25 f$
        $R_3 > R_4$
(III)    $0.16 f < -R_5 < 0.32 f$
        $0.25 f < +R_K < 1.25 f$
        $0.10 f < -R_6 < 0.25 f$
(IV)    $0.10 f < -R_7 < 0.25 f$
        $0.16 f < -R_8 < 0.32 f$
        $R_7 < R_8$ wherein $R_1$ and $R_2$ denote the front and rear radius of curvature, respectively, in the direction of light, of the first lens member of the lens front group; $R_3$ and $R_4$ denote the front and rear radius of curvature, respectively, of the second lens member of the lens front group; $R_5$ and $R_4$ denote the front and rear radius of curvature, respectively, of the first lens member of the lens rear group; $R_7$ and $R_8$ denote the front and rear radius of curvature, respectively, of the second lens member of the lens rear group; $R_K$ denotes the radius of curvature of the cemented surface in the first lens member of the lens rear group and f denotes the equivalent focal length of the objective.

2. A photographic objective as claimed in claim 1, in which the positive, meniscus-shaped cemented lens member has a cemented surface which is convex relative to the preceding diaphragm; the positive, meniscus-shaped cemented lens member of the objective has a cemented surface which is convex relative to the preceding diaphragm; the individual lenses forming the positive meniscus-shaped cemented lens member show a difference of refractive numbers, which is distinctly higher than 0.050, based on yellow light characterized by line d of the helium spectrum with a wave length of 5876 AE;

$$0.25 f < (R_4+R_5) < 0.75 f$$
$$0 < (R_4-R_5) < 0.25 f$$
$$0.25 f < (R_6+R_7) < 0.75 f$$
$$0 < (R_6-R_7) < 0.25 f$$
$$0.25 f < (R_1+R_8) < 0.75 f$$
$$0 < (R_1-R_8) < 0.25 f$$

wherein $R_1$, $R_4$, $R_5$, $R_6$, $R_7$, $R_8$, and f have the meaning defined in claim 1.

3. A photographic objective as claimed in claim 1, in which the curvature of the two strongly diverging inner lens surfaces limiting the diaphragm space meets the following conditions:

$$0.25 f < (R_4+R_5) < 0.75 f \text{ and}$$
$$0 < (R_4-R_5) < 0.25 f$$

wherein $R_4$ denotes the absolute length of the radius of curvature of the strongly diverging inner lens surface limiting the diaphragm space on the side of the major conjugate; $R_5$ denotes the absolute length of the radius of curvature of the strongly diverging inner lens surface limiting the diaphragm space on the side of the minor conjugate, and f denotes the equivalent focal length of the objective.

4. A photographic objective as claimed in claim 1, in which the curvature of the lens rear or outer surface of the positive, meniscus-shaped cemented lens member and the curvature of the lens front or inner surface of the last lens member which limits the objective on the side of the minor conjugate, meet the following conditions:

$$0.25 f < (R_6+R_7) < 0.75 f \text{ and}$$
$$0 < (R_6-R_7) < 0.25 f$$

wherein $R_6$ denotes the absolute length of radius of curvature of said lens rear surface of the positive, meniscus-shaped cemented lens member; $R_7$ denotes the absolute length of the radius of curvature of said lens front surface of the last lens member which limits the objective on the side of the minor conjugate and f denotes the equivalent focal length of the objective.

5. A photographic objective as claimed in claim 1, in which the curvatures of the two outer lens surfaces limiting the total objective on the side of the major conjugate and the minor conjugate, respectively, meet the following conditions:

$$0.25 f < (R_1+R_8) < 0.75 f \text{ and}$$
$$0 < (R_1-R_8) < 0.25 f$$

wherein $R_1$ denotes the absolute length of radius of curvature of the outer lens surface limiting the total objective on the side of the major conjugate, $R_8$ denotes the absolute length of radius of curvature of the outer lens surface limiting the total objective on the side of the minor conjugate, and f denotes the equivalent focal length of the objective.

6. A photographic objective as claimed in claim 1, in which the curvatures of the lens surfaces meet the following requirements:

(I) $R_1 = +0.24\,f$
$R_2 = +0.47\,f$ (II) $R_3 = +0.22\,f$
$R_4 = +0.17\,f$
Diaphragm space
$R_5 = -0.23\,f$ (III) $0.25\,f < R_K < 125.\,f$
$R_6 = -0.18\,f$ (IV) $R_7 = -0.16\,f$
$R_8 = -0.24\,f$ the positive, meniscus-shaped cemented lens member of the objective has a cemented surface which is convex relative to the preceding diaphragm; the individual lenses forming the positive meniscus-shaped cemented lens member show a difference of refractive numbers, which is distinctly higher than 0.050, based on yellow light characterized by line $d$ of the helium spectrum with a wave length of 5876 AE:

$$0.25\,f < (R_4 + R_5) < 0.75\,f$$
$$0 < (R_4 - R_5) < 0.25\,f$$
$$0.25\,f < (R_6 + R_7) < 0.75\,f$$
$$0 < (R_6 - R_7) < 0.25\,f$$
$$0.25\,f < (R_1 + R_8) < 0.75\,f$$
$$0 < (R_1 - R_8) < 0.25\,f$$

wherein $R_1$, $R_4$, $R_5$, $R_6$, $R_7$, $R_8$, and f have the meaning defined in claim 1.

ALBRECHT WILHELM TRONNIER.

References Cited in the file of this patent

UNITED STATES PATENTS

| Number | Name | Date |
|---|---|---|
| 1,168,873 | Florian | Jan. 18, 1916 |
| 2,084,309 | Bertele | June 22, 1937 |
| 2,171,640 | Berek | Sept. 5, 1939 |
| 2,446,402 | Aklin | Aug. 3, 1948 |
| 2,499,264 | Wynne | Feb. 28, 1950 |